July 3, 1928.
N. LEHMAN
1,675,501
COTTON PICKING DEVICE
Filed May 22, 1925     2 Sheets-Sheet 1
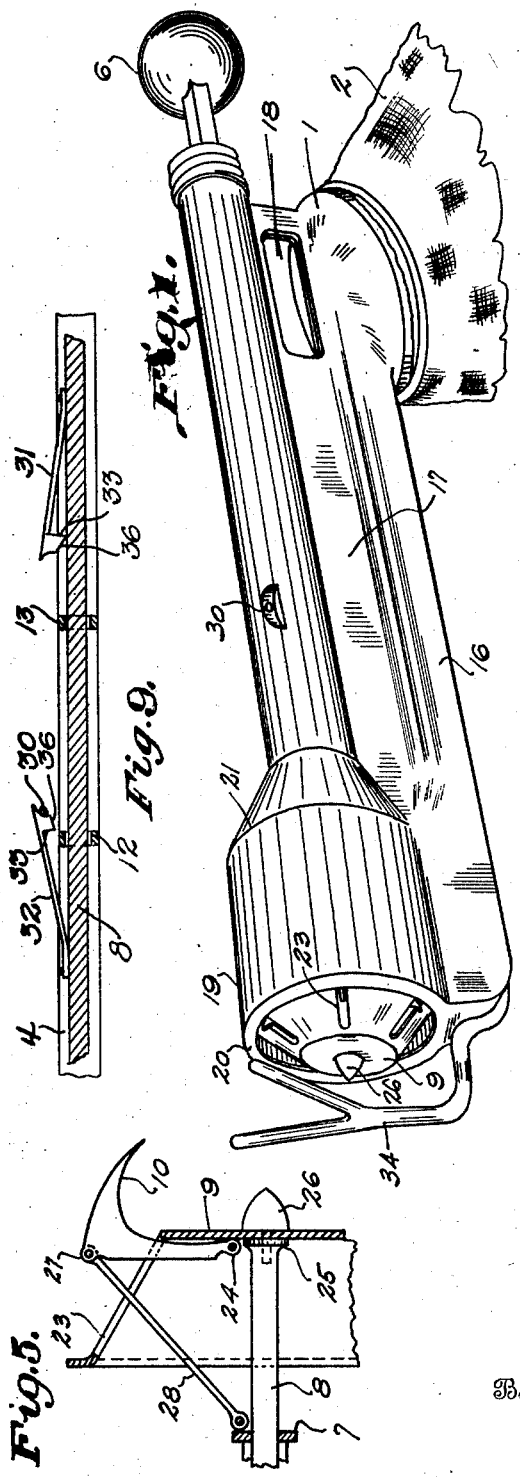
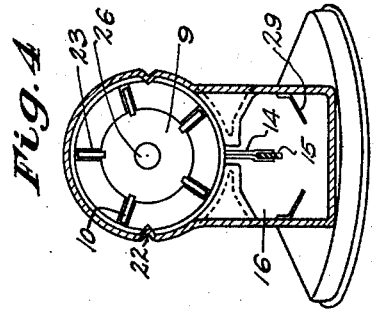
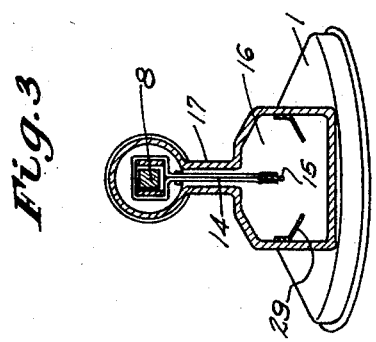
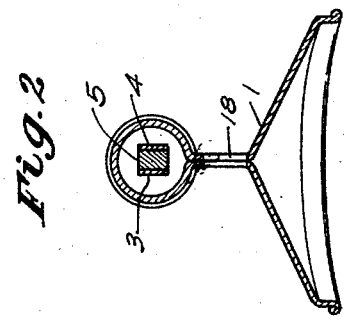
Inventor
N. LEHMAN.
Attorney July 3, 1928.
N. LEHMAN
COTTON PICKING DEVICE
Filed May 22, 1925
1,675,501
2 Sheets-Sheet 2
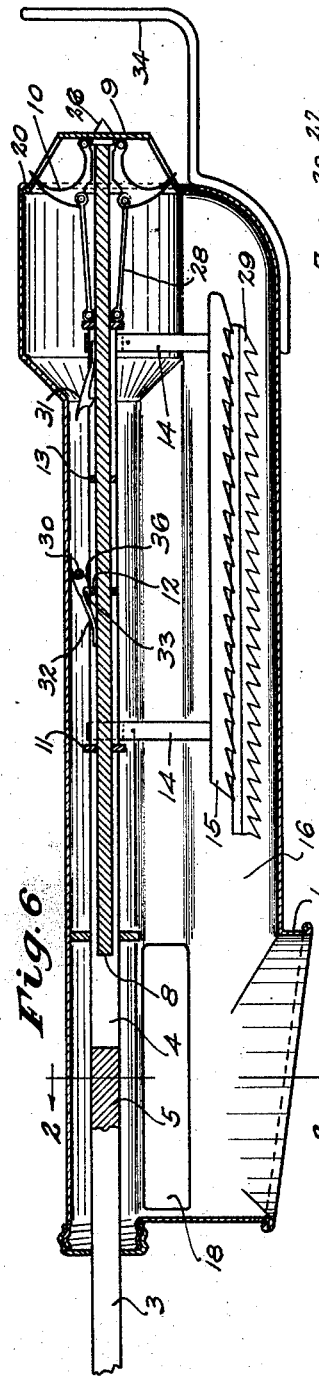
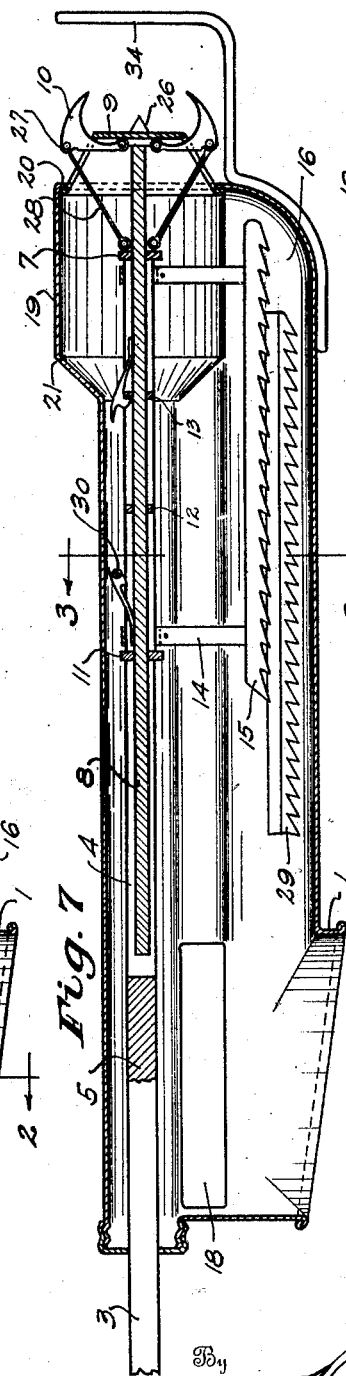
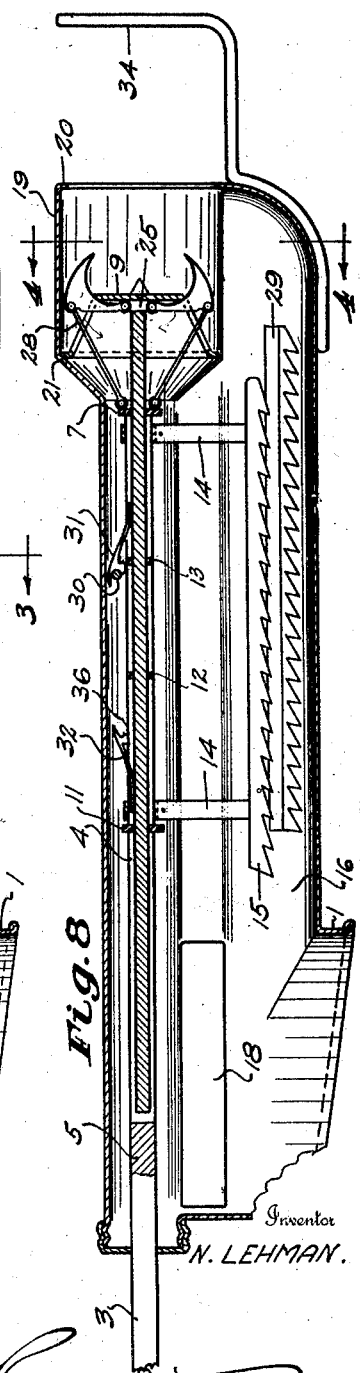
Inventor
N. LEHMAN.
Attorney Patented July 3, 1928.

1,675,501

UNITED STATES PATENT OFFICE.

NICHOLAS LEHMAN, OF BIRMINGHAM, ALABAMA.

COTTON-PICKING DEVICE.

Application filed May 22, 1925. Serial No. 32,223.

My invention relates to a hand operated cotton picking device which is characterized by the fact that the grab elements are designed and so actuated, relatively to a housing, that such elements with each complete reciprocation of a plunger advance, automatically grasp the cotton locks, retract into the housing and then release the cotton locks within the housing where feed means are preferably provided to convey the picked cotton to a convenient point of discharge, either into a sack or into any suitable receptacle.

While my device is more particularly designed for hand operation, it is obvious that the novel details of its grab and release mechanism can be applied to any machinery for the picking of cotton or the like.

My invention contemplates the ultilization of a reciprocable plunger adapted to move both with and relatively to the picking agencies, the relative movements acting to cause the grab elements of the picking agencies to engage and release the cotton locks.

My invention further comprises the novel details of construction, arrangements of parts and manner of operation, all of which will be more clearly and fully understood by reference to the accompanying specification and the drawings which illustrate the preferred embodiment of my invention, and which form a part of this specification.

In the drawings:—

Fig. 1 is a perspective view of my improved device shown with the parts in position just before the plunger is fully advanced and the grabs move outwardly into position to grasp the cotton.

Fig. 2 is a cross-sectional view taken on the line 2—2 of Fig. 6.

Fig. 3 is a cross-sectional view taken on the line 3—3 of Fig. 7.

Fig. 4 is a cross-sectional view taken on the line 4—4 of Fig. 8.

Fig. 5 is a detail longitudinal sectional view showing the manner of mounting the grab elements on the plunger.

Fig. 6 is a longitudinal sectional view through the device showing the parts with the plunger advanced its full forward stroke but with the grabs still retracted.

Fig. 7 is a similar view to Fig. 6 showing the grabs advanced to grasp the cotton locks.

Fig. 8 is a similar view to Fig. 6 showing the plunger and grabs drawn back into the device preparatory to retraction of the grabs to release the cotton.

Fig. 9 is an enlarged longitudinal sectional view through the plunger showing the stop and latch elements more clearly in the position they occupy in Fig. 6.

Similar reference numerals refer to similar parts throughout the drawings.

In the embodiment of my invention illustrated, I show the device as comprising a metal housing having at its rear end a flanged and beaded neck 1 which is adapted to have connected thereto a bag or other suitable receptacle 2 which is partly illustrated and which may be carried in any desired manner by the operator. A plunger formed by spaced parallel bars 3 and 4 works through the casing, said bars at their outer ends having a filler block 5 interposed between them and carrying a knob or operating handle 6. The bars 3 and 4 at their forward end are connected by a circular head or block 7 which is provided with a central guide opening for the shaft 8 which carries the plunger head plate 9 and the grabs 10. The shaft 8 is guided near its rear end by a guide block 11 mounted fast between the plunger bars and is also guided at intermediate points by spaced spring catches 12 and 13 which are also mounted fast between the plunger bars in any suitable manner and provided with suitable apertures through which the shaft 8 slides freely. The plunger bars have side notches which receive a pair of clamp bars 14 bolted together and adapted at their lower ends to carry a toothed movable feed bar 15 that depends into the lower flaring base 16 of the housing.

The housing is preferably made in vertical right and left half sections, which throughout their intermediate portion, except at the forward end of the housing, are drawn closer together at 17 and this portion is cut away at the rear end to provide the grip opening 18 through which the fingers of the operator's hand are passed to enable him to grasp the device. At its forward end the housing sections are enlarged and flared to form a barrel 19 which would be circular except that its bottom portion is left open so that the cotton that is drawn into it will fall therethrough into the flaring base of the housing. The plunger head plate 9 is dished with its largest diameter corresponding substantially to that of the barrel 19 and adapted to slide freely therein, being stopped at the forward end of its stroke by the flange 20 and at the rear end of its stroke by a shoulder 21. The plate is held against rotation by the engagement of the longitudinal guide shoulder 22 with a corresponding notch in its edge.

The bevelled face of the plate is provided with a series of radial slots 23, preferably five in number and equidistantly spaced, through which the grabs 10 work and by means of which they are guided. These grabs are pivotally mounted at 24 about the shank 25 of a screw 26 which serves to mount the plate 9 on the shaft 8. The head of the screw is tapered (see Fig. 8), and the several grabs are provided each with a hook 27 that is engaged by its respective actuating rod 28, such rods being pivotally connected to the head 7 on the plunger.

I mount on each side of the flaring base 16 within the housing fixed toothed elements 29 which project inwardly towards the movable toothed element 15 and which act to prevent any forward movement with the element 15 of cotton which has been drawn rearwardly into the housing with a rearward movement of the plunger.

Across the top of the housing above the plunger I mount a fixed stop pin 30 and I provide on the shaft 8 a pair of reversely disposed spring detents 31 and 32 each having on its underside a shoulder 33 with a bottom bevel 36, which is adapted to co-act with the catches 12 and 13. I mount at the forward end of the housing a V-shaped boll holder 34 mounted on a bracket attached to the underside of the housing at its forward end.

In operation, assuming the plunger retracted, the forward detent 31 will by engagement with the stop pin 30 have arrested the inward movement of the plunger head plate 9 and shaft 8 before the main plunger elements 3, 4 and 5 reach their extreme inward movement, and the continued movement of the latter plunger elements will have acted through the head 7 and connections 28 to have retracted all of the grabs, which is the position in which they stand in both Figs. 1 and 6. As the operator, after having caused the holder 34 to engage a boll of cotton as shown in Fig. 1, commences the forward or outward stroke of the plunger, the catch 13 will first act, by engagement with the shoulder 33 of the spring 31, to cause the shaft 8 and the plunger to move forward together until the detent 32 on the shaft 8 strikes the pin 30 which arrests it and, due to the bevelled design of the detent where it strikes said pin the latter will raise it until it becomes disengaged from the catch 12, thus allowing the plunger to continue its forward relative motion after the plunger head and shaft 8 have been stopped by the flange 20. This further or relative motion of the plunger to the plunger head, acting through the head 7 and arms 28, will cause the grabs to move from the retracted position shown in Fig. 6 to the advanced position in Fig. 7 in which they will grasp the cotton. Meanwhile it will be observed that the catch 12 acting against the bevelled face 36 of the detent 32 will have ridden under the latter and into position to engage its shoulder 33. Upon the retraction of the plunger, the detent 31 on shaft 8 by engagement with the catch 13 on the plunger, will cause the plunger head and shaft 8 to be retracted with the plunger without change in the position of the grabs. This condition continues until the detent 31 engages the stop pin 30 and is raised thereby to release it from the stop 13 and permit the plunger to continue rearward movement after the shaft 8 is stopped. This additional or relative movement of the plunger acts through its head 7 and the connections 28 to retract the grabs and release the cotton so that it will drop into the lower portion of the housing in position to be engaged by the toothed feed bar 15 when the latter next moves forward. Meanwhile the stop 12 will have moved into position to engage the bevel face 36 of the detent 31 and raise the latter to permit the stop to engage behind the shoulder 33 of the spring detent 31 and the whole operation is ready to be repeated. Relative to the feed, the forward stroke of the toothed bar 15 will not carry the cotton forward because it will be held back by the fixed toothed bars 29 on each side. All of the teeth on the bars 15 and 29 incline in the same direction, the retraction of the movable member 15, acting always to feed the cotton rearwardly and through the neck 1 into the cask or receptacle 2. Thus it will be seen that the action of the stop pin 30, spring detents 31 and 32 and the spring catches 12 and 13, permit automatically first a joint movement of the plunger and head and then a relative movement between plunger and head for each direction of motion, and the relative movements effect the advancing and retracting of the grabs which otherwise travel with the plunger without change in position. Hence the device acts to project the whole picker means towards the cotton, then to advance the grabs to grasp the cotton locks, then to retract all of the picker means with the grasped cotton into the housing, and finally to retract the grabs and release the cotton within the housing. With practice the device can be operated with great rapidity.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A cotton picker comprising a reciprocable plunger, a housing for guiding said plunger, grab means reciprocable with the plunger, automatic means to disengage the grab means from the plunger at an intermediate point in its travel in each direction, and co-acting means responsive to resultant relative movement between the plunger and grab means to cause the latter to engage and release cotton.

2. A cotton picker according to claim 1, in which the grab means comprises a plunger head movable within the housing and grabs movable relatively to said plunger head and into and out of said housing.

3. A cotton picker according to claim 1, in which the grab means comprises a plunger head movable within the housing and grabs pivotally mounted about the latter and retractable with the plunger head into the housing to release the cotton.

4. A cotton picking device comprising a housing, a plunger reciprocable therein, grab elements movable in the housing, automatic means to interlock the plunger and grab means during the major portion of the travel of the plunger in each direction, automatic means to disengage the grab means from the plunger during the final portion of its movement in each direction, and co-acting means responsive to relative movement between the plunger and grab means to actuate the latter to engage and release cotton.

5. A cotton picker comprising a housing having in its forward end a retractable plunger head carrying movable grabs, a plunger reciprocable through the housing, co-acting elements acting automatically to interlock the plunger and plunger head during the major portion of the forward and rearward travel of the plunger, stop means to disengage the plunger head from the plunger at an intermediate point in the travel of the plunger in each direction, and co-acting means responsive to the resulting relative movement between plunger and plunger head for actuating the grabs, substantially as described.

6. A cotton picking device comprising a housing having a substantially cylindrical barrel-like portion at its forward end merging into a flaring base, a plunger reciprocable through the upper portion of the housing, feed elements for the picked cotton, comprising fixed teeth on the housing and movable teeth on the plunger, grab means reciprocable in the barrel-like portion of the housing, and an operating connection between plunger and grab means adapted to provide both a common and a relative movement, the former movement acting to reciprocate the grab means with the plunger and the latter movement to operate them to grasp and release the cotton.

7. A cotton picking device, comprising a housing, a reciprocable picker means projectible from the housing, and a stationary boll holder yoke mounted to project upwardly in front of the housing and spaced from the end of the housing in position to engage and hold the boll spaced from the housing end.

8. In a cotton picker, the combination of a housing, relatively movable co-acting elements mounted in the housing adapted to grasp and draw the cotton into the housing, and an upstanding rigid yoke member mounted on the housing with the yoke disposed in advance of and in a plane substantially at right angles to the long axis of the housing and adapted to hold the boll in position for said co-acting elements to grasp and draw the cotton therefrom into the housing.

In testimony whereof, I affix my signature.

NICHOLAS LEHMAN.